United States Patent [19]

Johansson et al.

[11] Patent Number: 4,963,318
[45] Date of Patent: Oct. 16, 1990

[54] SPRING LOCK WASHER FOR TIE ROD NUTS

[75] Inventors: Eric B. Johansson; Michael V. Curulla, both of San Jose, Calif.

[73] Assignee: General Electric Company, San Jose, Calif.

[21] Appl. No.: 342,067

[22] Filed: Apr. 24, 1989

[51] Int. Cl.⁵ .............................................. G21C 3/32
[52] U.S. Cl. ..................................... 376/446; 376/434
[58] Field of Search .................................. 371/434, 446

[56] References Cited

U.S. PATENT DOCUMENTS

| | | | |
|---|---|---|---|
| 3,775,249 | 11/1973 | Clapham | 376/446 |
| 3,878,042 | 4/1975 | Curulla | 376/446 |
| 3,968,008 | 7/1976 | Piepens | 376/446 |
| 4,036,692 | 7/1977 | Walton | 376/446 |
| 4,851,187 | 7/1989 | Lippert | 376/448 |

*Primary Examiner*—Donald P. Walsh
*Attorney, Agent, or Firm*—Robert R. Schroeder

[57] ABSTRACT

In a nuclear fuel bundle, an improved lock washer is disclosed for permitting ease of remote removal of hex nuts on tie rods for the remote submerged disassembly of fuel bundles after use in a reactor. The improved lock washer includes two spaced apart and interconnected tie rods surrounding washer members, each of these tie rod washer members having radially inwardly extending keys. These keys register to corresponding keyways in the threaded ends of the tie rods to prevent tie rod rotation and threaded disengagement from the lower tie plate. Each washer member is manufactured from a spring material and includes at least one and preferably two radially protruding tangs T. These tangs are elongate and bent in an inverted U-shaped configuration. The inverted U-shaped configuration commences at the washer member and extends upwardly and outwardly away from the hex bolt to be locked. Reversal of the spring member occurs at the end of the U with the spring member returning angularly back towards the tie rod. In the return toward the tie rod, a gradual inward slope defining a gathering surface between the tie rod and bolt on one hand and the U-shaped tang on the other hand is defined that the U-shaped tang. From the end of the gathering surface, the tang extends vertically downward in a position of spring interference with one of the flat sides of the hexagonal bolt holding the tie rod in place. When the tie rod washer is in place with the nut fastened, the tang prevents the bolt from turning responsive to vibration and upward force on the upper tie plate due to outflowing water and steam. In remote disassembly of the fuel bundle, the gathering surface permits the tang to be biased away from the sides of the bolt by a specialized socket that penetrates interstitially between the lock washer and nut and captures the nut when it is unscrewed. The lock washer because of its spring action returns to its initial shape after the socket and nut are removed. In contrast to the prior art lock washer, the lock washer tangs strains and deformations are elastic. The possibility of tang breakage is eliminated and the lock washers can be reused.

3 Claims, 3 Drawing Sheets

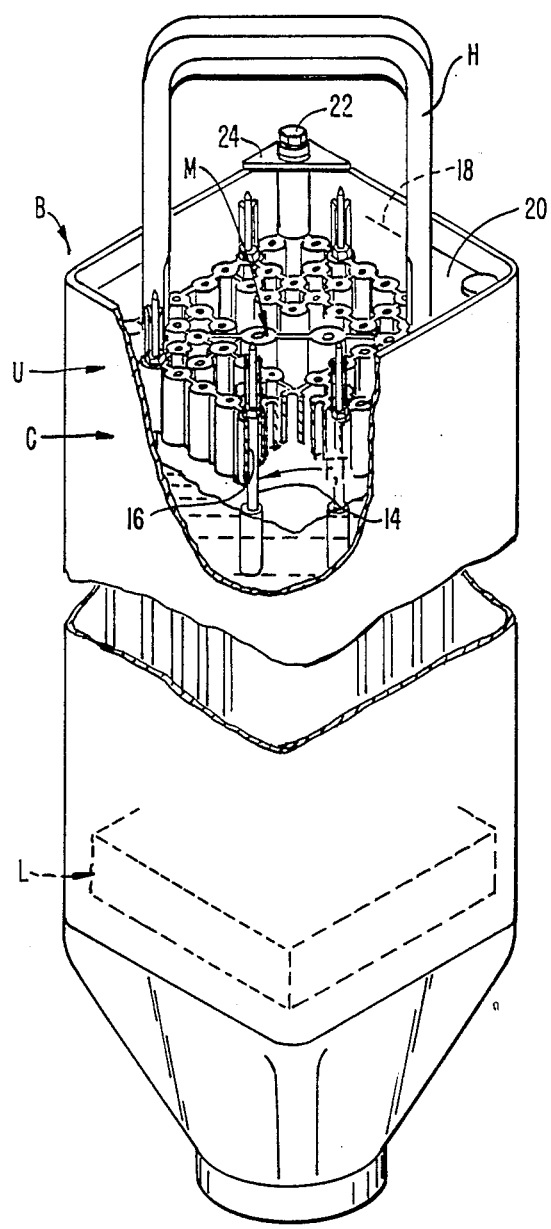
FIG._1.

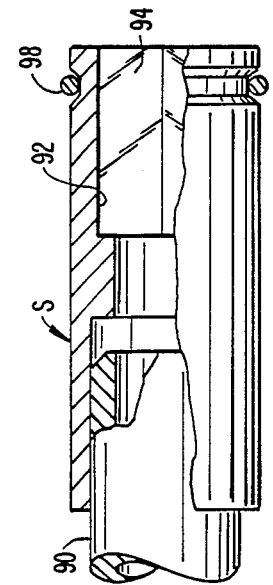
FIG._3A.
PRIOR ART
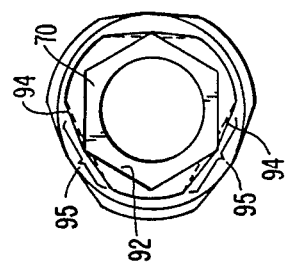
FIG._3B.
PRIOR ART
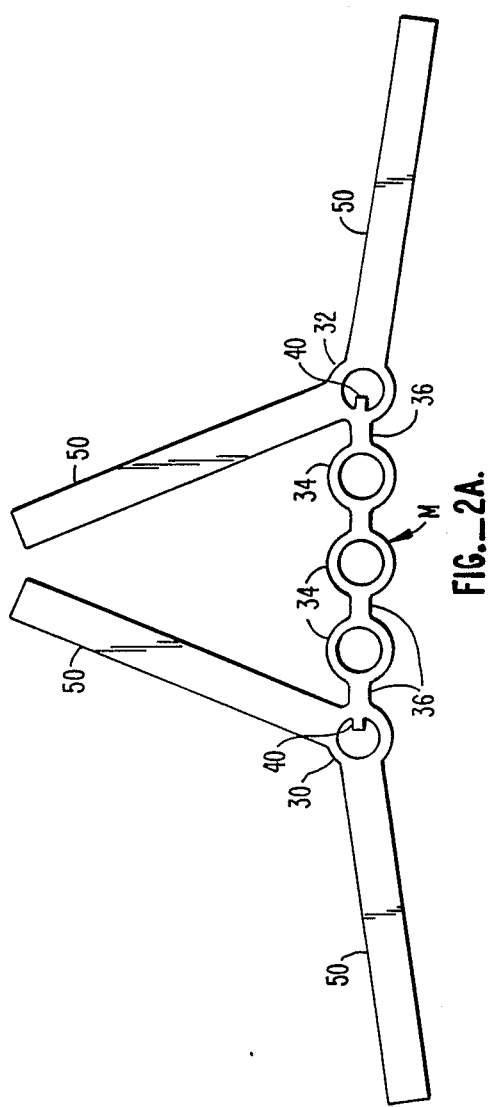
FIG._2A.
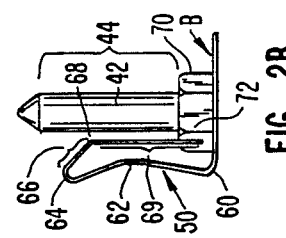
FIG._2B.

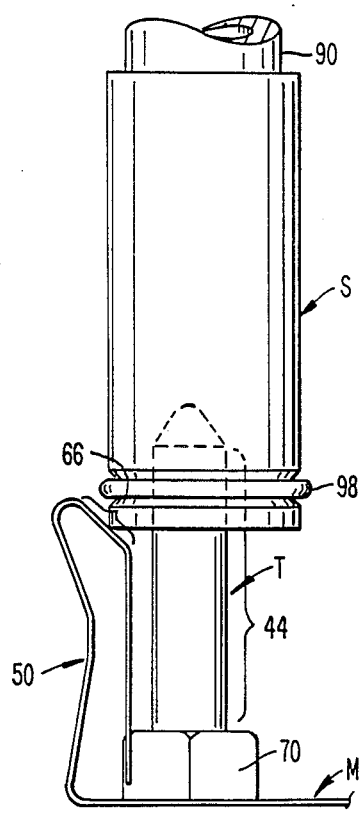
FIG._4A.
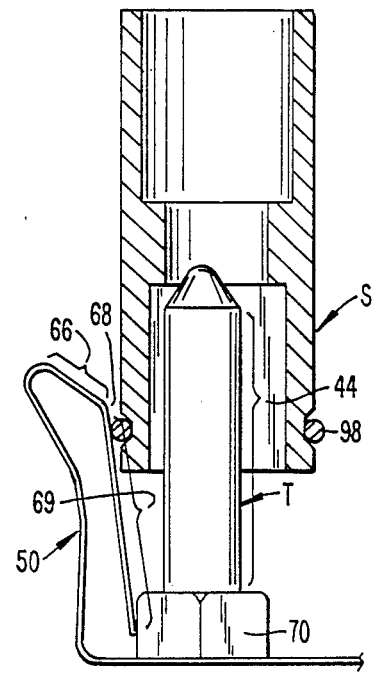
FIG._4B.
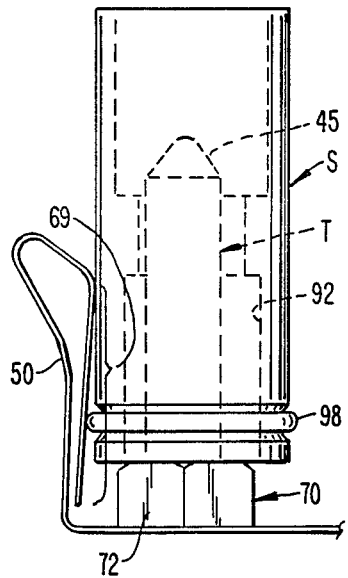
FIG._4C.
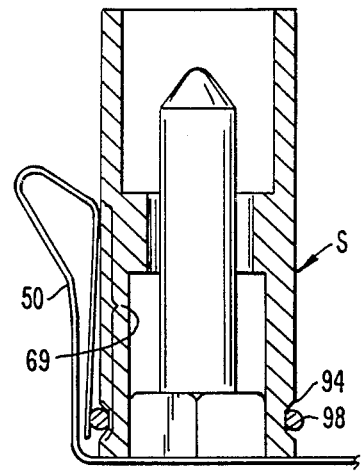
FIG._4D.

SPRING LOCK WASHER FOR TIE ROD NUTS

This invention relates to nuclear fuel bundles. More particularly, a new and improved lock washer is disclosed for permitting the locking of bolts on tie rods at the upper tie plates in order that fuel bundles may be held together as unitary articles.

SUMMARY OF THE PRIOR ART

Nuclear fuel bundles in boiling water reactors typically are unitary articles that can be lifted to and from the reactor core for disassembly and inspection. While the initial assembly of such fuel bundles is a conventional process which is nonradioactive and therefore mechanically conventional, the disassembly of such fuel bundles must be remote and submerged to shield workers from the inevitable radioactivity.

To understand the problem solved by this invention, the general construction of such fuel bundles must be summarized. Thereafter, lock washers used in the prior art will be described.

The general construction of such fuel bundles can be summarized. The bundles include a lower tie plate, an upper tie plate, and a plurality of upstanding and vertical fuel rods extending therebetween. The upper and lower tie plates and the fuel rods therebetween are surrounded by a square sectioned channel. This channel functions to confine fluid flow from the lower tie plate to the upper tie plate. In bundle operation, the lower tie plate permits the inflow of neutron moderating water coolant. The upper tie plate permits the outflow of the water coolant and generated steam. A group of the fuel bundles placed in side-by-side relation makes up the reactor core and produces the reactor power.

The upper and lower tie plates must be fastened together to maintain the fuel bundle as a unitary article. Consequently, certain of the fuel rods are provided with threaded ends to tie the fuel bundle together. These fuel rods having threaded ends are designated as "tie rods."

The operation of the tie rods is easy to understand. The tie rods have threaded lower ends and threaded upper ends. The tie rods at their threaded lower ends engage threaded apertures in the lower tie plates. The tie rods at their upper threaded ends extend through the upper tie plate at apertures designed for this purpose. Over these threaded ends protruding above the upper tie plate are fastened nuts. In the prior art, lock washers have been used to ensure that the nuts do not become unscrewed over time, due to reactor fluid flow and vibration.

In the prior art lock washers, a group of fuel rod surrounding washer members are banded together. For example, four such fuel rod banding washer members can be interconnected with each washer member surrounding a discrete fuel rod as it protrudes above the upper tie plate.

Of the four fuel rod surrounding members, two of these members — preferably those most spaced apart — surround rods having threaded ends or so-called "tie rods".

The prior art lock washers accomplish two well known functions.

First, they must prevent the tie rods themselves from undergoing rotation. To prevent tie rod rotation, each of the tie rods at their respective upper threaded ends are configured with elongate keyways interrupting the threads. These keyways protrude vertically of the threads at the end of the tie rods.

The washer members surrounding each of the tie rod threaded ends are provided with inwardly extending radial keys. These keys protrude into the keyways when the washer members are placed over the ends of the tie rod. Remembering that the washer members surrounding two such tie rods are connected together, neither washer member is free to rotate because of its attachment to an adjacent washer member. Thus, once a single lock washer member extending between two tie rods is fitted with each of its two radially protruding keys protruding into the elongate keyways at the upper threaded ends of the two tie rods, both rods are mutually locked against relative rotation by the lock washer member. As the tie rods are mutually locked against relative rotation, the tie rods cannot rotate free from their threaded engagement with the lower tie plate.

This feature of the prior art is incorporated into the disclosure herein.

The prior art lock washers have a second well known function. This function is to inhibit the rotation of the nut holding the upper tie plate to the tie rod.

In the prior art the tie rod surrounding washer members have been provided with the elongate protruding tangs. The tangs extend radially outward from the tie rods surrounding washer members. As it is the function of these tangs to be permanently deformed and bent to lock the bolts into place, the entire locked washer member is manufactured from a stainless steel having a relatively high ductility.

In the initial assembly of nuclear reactor fuel bundles, it will be remembered that the fuel bundles are not radioactive. Thus, once the upper tie plates are placed over the end of the fuel bundles and the tie rods at their threaded ends protrude beyond the end of the upper tie plate, the washer members are placed over the tie rods and lowered into place over the top surface of the upper tie plate. The keys on the lock washer slide down through the keyway in the tie rod ends. Hex nuts are placed on the threaded ends of the tie rods and tightened. They capture the lock washer between the upper tie plate and the lower surface of the hex nut. Thereafter, a plurality of bendable tangs from each washer member are bent up and over the tightened hex nuts. These bendable tangs contact the sides of the hex nuts and prevent their rotation effectively locking the bolts to the tops of the upper tie rods. Once all nuts are installed and the lock washer tangs are bent into position, the fuel bundle is placed in the reactor and used for the generation of power.

During the active use of the fuel bundle in the reactor, it will be remembered that the forces of gravity acting on the fuel bundle tend to hold the fuel bundle together. Two forces can act to unscrew the hex nut at the upper ends of the tie rods.

First, there is the inevitable vibration induced by the operation of the reactor, especially the upwardly flowing water and steam from the fuel bundle through the upper tie plate.

Second, this same upwardly flowing fluid stream will impose a minor upward force on the upper tie plate relative to the rest of the fuel bundle. Without the presence of the lock washer, unscrewing of the hex nuts on the upper tie rod is a distinct possibility. However, once a minor restraining force is present on the side of the hex nuts, any possibility of undesired rotation and unscrewing of the hex nuts is removed.

Once the fuel bundle is use for the generation of power, it becomes radioactive and remote submerged handling is required. It is in this remote submerged handling that the prior art lock washer has encumbered the process of fuel bundle disassembly. Fuel bundle disassembly is required particularly where inspection and/or replacement of individual fuel rods is required during reactor outage intervals in the middle of the fuel bundle active in-service life.

Typically, the fuel bundles are first removed from the reactor core where they are submerged and transported to a reactor holding pool for disassembly where they are again submerged (in the order of 20 feet). In order for the hex nuts over the tie rods to be unscrewed, the tangs from the lock washers must be bent a second time. They must be bent away from their position of contact with the sides of the hex nuts a sufficient distance to allow a specialized nut retaining socket to engage the hex nut completely around its periphery. This bending of the tangs is typically accomplished with a special remote tool and requires an individual and discrete time consuming step, consuming valuable reactor outage time. Once such bending occurs, the fuel bundle can be disassembled and inspected.

Unfortunately, because of the well known phenomenon of metal fatigue, there is a possibility of breakage when the lock washer tangs are bent away from the hex nuts. If a tang breaks off it must be retrieved and disposed of. Loose radioactive parts are not acceptable in the reactor holding pool. If a broken tang were lodged in the fuel bundle, it could be returned to the reactor with the fuel bundle. Loose parts in the reactor are not acceptable.

If the lock washers were reused there would be a greater probability of tang breakage when the tangs are re-bent to the locking position. Therefore, when fuel bundle are reassembled after inspection, new lock washers are required. The old lock washers are discarded as radioactive material.

SUMMARY OF THE INVENTION

In a nuclear fuel bundle an improved lock washer is disclosed for permitting ease of remote removal of hex nuts on tie rods for the remote submerged disassembly of fuel bundles after use in a reactor. The improved lock washer includes two spaced apart and interconnected tie rod surrounding washer members, each of these tie rod washer members having radially inwardly extending keys. These keys register to corresponding keyways in the threaded ends of tie rods to prevent tie rod rotation and threaded disengagement from the lower tie plate. Each washer member is manufactured from a spring material and includes at least one and preferably two radially protruding tangs T. These tangs are elongate and bent in an inverted U-shaped configuration. The inverted U-shaped configuration commences at the washer member and extends upwardly and outwardly away from the hex bolt to be locked. Reversal of the spring member occurs at the end of the U with the spring member returning angularly back towards the tie rod with a gradual inward slope so as to define a gathering surface between the tie rod and bolt on one hand and the U-shaped tang on the other hand. From the end of the gathering surface, the tang extends vertically downward in a position of spring interference with one of the flat sides of the hexagonal bolt holding the tie rod in place. When the tie rod washer is in place with the nut fastened, the tang prevents the bolt from turning responsive to vibration and upward force on the upper tie plate due to outflowing water and steam. In remote disassembly of the fuel bundle, the lock washer at the gathering surface permits the tang to be biased away from the sides of the bolt by a specialized socket that penetrates interstitially between the lock washer and bolt and captures the bolt when it is unscrewed. Because of its spring action, the new lock washer has the capability of reuse after fuel bundle disassembly. In contrast to the prior art lock washer, the tang deformation is elastic, and the tangs return to their original shape after the socket and hex nut are removed.

OTHER OBJECTS, FEATURES AND ADVANTAGES

An object to this invention is to disclose a simplified lock washer construction that does away with the requirement for tangs which are permanently deformed during installation and removal. Accordingly, the lock washer is fabricated from a spring material such as Inconel X 750, a trademark of the International Nickel Company of Newark, N.J. The tangs are initially formed to radially extend away from the tie rod surrounding washer members. The tangs are each bent in an inverted U configuration. The U-shaped configuration commences at the washer member and extends upwardly and outwardly away from the threaded end of the tie rod and the space where the bolt is to be captured. Reversal of the spring member occurs with path reversal back downwardly towards and angularly towards the tie rod at a curvature remote from the tie rod. Material of the bend back towards the tie rod initially slopes gradually inward to the threaded end of the tie rod so as to define a gathering surface between the tie rod and bolt on one hand and the spring biased tang on the other hand. From the end of the gathering surface, the tang extends vertically downward in a position of interference with one of the flat sides of the hexagonal bolt holding the tie rod in place. Preferably, each tie rod surrounding washer member includes two tangs with each tang having the U-shaped bend just described.

An advantage of the tang is that no special tool is required for permanently biasing the tangs out of interference with the sides of the lock washer during remote submerged disassembly of the fuel bundle. Instead, the tangs bend elastically in their contact with the side of the hex nut and permit the entry and exit of a socket. Consequently in the remote disassembly of the fuel bundle — for example, inspection during a reactor outage in the middle of fuel rod in-service life — disassembly is simplified. The spring biased tang permits socket entry to capture the bolt. The gathering surface on the tang enables the spring biased tang member locking the bolt from rotation to be biased outwardly and away from the bolt to permit socket capture of the bolt.

A further advantage is that valuable time during reactor outage is conserved. Since the disclosed lock washer requires no special tool for the disengagement of the tangs from the lock washers, use of a special tool for such purposes is not required and more importantly the time required for the use of such special tools is conserved.

Yet another advantage is that valuable time of submerged reassembly of fuel bundles is also conserved. The disclosed lock washer can be reused. Further, where the lock washer is replaced over the ends of the tie rods and a nut is tightened, again no special tool for the engagement of bendable tangs to the hex nuts are required. Again, time in reassembling the fuel bundle is conserved.

An additional advantage of the improved lock washer is that the spring material remains elastic while the tangs are bent. Then breakage of the tangs will not occur.

An additional advantage of the improved lock washer is that it can be reused. No longer must the lock washer part be discarded upon fuel bundle disassembly for inspection.

BRIEF DESCRIPTION OF THE DRAWINGS

Other objects, features, and advantages of this invention will be more apparent after referring to the following specification and attached drawings in which:

FIG. 1 is a perspective view of a 9×9 fuel bundle illustrating the improved lock washer of th:s invention in place;

FIG. 2A is a view of a lock washer member illustrating two remote tie rod surrounding members with their inwardly protruding radial keys banded together by three fuel rod surrounding members with tangs shown in the unbended disposition;

FIG. 2B is a detail illustrating one of the tangs bent in accordance with the teachings of this invention and illustrating the maximum interference of the end of the tang with a tie rod retaining nut;

FIG. 3A is a view of a specialized nut retaining socket in side elevation section;

FIG. 3B is an end elevation view from the nut receiving end of the socket of FIG. 3A;

FIGS. 4A–4D are a cartoon series of the socket of FIGS. 3A and 3B being utilized to displace the tang of FIG. 2B and to remotely disassemble the nut from the top of the tie rod.

Referring to the perspective of FIG. 1 a fuel bundle B is shown. The perspective includes an exposed upper tie plate U with a channel C surrounding the upper end of the tie plate so as to force the flow of water and steam generated interior of the fuel bundle up to and through the upper tie plate U. The lower tie plate L is schematically shown at the end of the broken away full bundle B.

Upper tie plate U includes a conventional handle H. Handle H is the member which is used to lift the fuel bundle B to and from the reactor core and to place the fuel bundle within the reactor holding pool (neither the core nor the holding pool being illustrated in the instant application).

Referring to FIG. 1 a typical fuel rod F is illustrated. The rod F includes a narrowed portion 14 which narrowed portion 14 is movable upwardly and downwardly with respect to the upper tie plate U and the aperture 16 through which the fuel rod fits.

It is common that during active fuel rod life within a reactor, that the overall lengths of the fuel rods expand. Expansion can occur up to a maximum degree of excursion shown at 18. Thus, the tangs of the instant invention must not interfere with the end of the fuel rods at 18.

Likewise, and protruding in a cantilevered manner from the handle H of the upper tie plate is a channel retaining member 20. Channel retaining member 20 through a specialized bolt 22 and a channel retaining clip 24 retains the channel to the upper tie plate and in its position extending from the lower tie plate to the upper tie plate. Again, the tangs must be configured so as not to interfere with the cantilevered member 20.

Likewise, the improved tangs of this invention utilized with the lock washer must be disposed so as to not interfere with the sides of the channel C.

Having set forth these parameters, the lock washer of this invention will now be described with respect to FIGS. 2A and 2B. FIG. 2A will be utilized to describe the initial stamping and configuration of the lock washer. FIG. 2B will be utilized to describe the bending of one of the tangs into a position of interference with the sides of the hex nuts.

Referring to FIG. 2A and remembering that the fuel bundle of FIG. 1 constitutes a 9×9 array, it will be seen that fuel bundle at the upper tie plate is held in place by a total of eight tie rods T. Four lock washer members M are utilized to hold and lock eight tie rod bolts into place. Each lock washer member M secures in place one hex nut on a first tie rod and another hex nut on a second tie rod.

Referring to FIG. 2A, it can be seen that two tie rod surrounding washer members 30, 32 are at the distal ends of member M. They are connected by three fuel rod surrounding washer members 34. All members 30, 32, 34 are interconnected by connecting bands 36. It is the purpose of the fuel rod surrounding washer members 34 and the interconnecting bands 36 to prevent relative rotation of the tie rod surrounding washers 30, 32.

Each of the tie rod surrounding members 30, 32 includes an inward radially extending key 40. Key 40 fits to a keyway 42 in threads 44 at the end of each tie rod T. It can be understood with reference to FIG. 1 that once member M is placed over the end of two tie rods T and the respective keys 40 threaded to the keyways 42, the two tie rods T are no longer free to rotate. Instead, the tie rods T will each mutually lock the remaining tie rod through the lock washer member M against relative rotation. Thus the tie rods T will be prevented from unthreading from the lower tie plate (the lower tie plate not being shown).

As has been previously explained, this aspect of the invention is prior art.

FIG. 2A differs from the prior art in three important aspects.

First, the material from which the lock washer member M is stamped is a spring material such as Inconel X 750, a trademark of the International Nickel Company of Newark, N.J. In the prior art, the material constituted a stainless steel 304 having high ductility and poor spring quality.

Second, and in the prior art, three tangs 50 were utilized. As the viewer can plainly see here only two tangs 50 are utilized, these tangs 50 being disposed so as not to interfere with either the channel C, adjacent fuel rods F, or component of upper tie plate U.

Third, when the lock washer of this invention is stamped from sheet material to form the configuration of FIG. 2A, the material is in the annealed condition. In this condition, the yield strength is low and the ductility is high, so that the tangs can easily be bent into the final shape shown on FIG. 2B. After this bending, the material is heat treated to produce a spring material. Deformations from the shape of FIG. 2B will then be elastic, and the lock washer will return to this shape after deformation.

Having set forth a stamping from which the lock washer of this invention can be fabricated, the bending of the tang 50 will now be illustrated with respect to FIG. 2B.

Referring to FIG. 2B, lock washer member B at tang 50 is illustrated. Tang 50 is bent in an inverted generally U shaped configuration.

A first bend 60 exceeds 90° and forms the outside of the U away from the threaded end 44 of the tie rod T. The length of the tang extends angularly slightly inward at an angle of approximately 10° to a second, gradual bend 62. At gradual bend 62 the bend of the tang reverses to the end of the U.

At the end of the U a bend 64 in the order of 160° occurs. This bend defines on the side 66 of the tang disposed towards the threaded end of the tie rod 44 a gathering surface 66. As will hereinafter be more fully set forth, gathering surface 66 functions to permit a socket to penetrate interstitially between the tang member 50 and a hex nut 70 fastened over the top of lock washer member B. Gathering surface 66 ends at a bend 68.

Thereafter the tang 50 extends downwardly in a nut engaging flat member 69. Member 69 typically contacts in an interference one of the flat sides 72 of the hex nut 70.

Forces of vibration and fluid outflow acting on the upper tie plate U and the hex nut 70 could cause unscrewing of the nut 70 in the absence of the force at tang 50 from member 69 on a side 72 of the hex nut 70.

Remembering that the initial assembly of fuel bundles is nonradioactive and conventional, more important aspects of fuel bundle disassembly for individual rod inspection will be discussed. Such a discussion requires first that the nut retaining socket of the prior art shown in FIG. 3A and 3B be briefly set forth. Thereafter, and with reference to the cartoon series of FIGS. 4A-4D, disassembly of the nut 70 by the socket of FIGS. 3A and 3B can be understood.

Referring to FIG. 3A a socket S is illustrated. It will be understood that socket S is disposed and captured at the end of a long torquing rod 90.

Socket S includes a conventional nut retaining aperture 92 shown in FIGS. 3A and 3B. The exterior of the socket S is milled with grooves 94 which grooves have flat spots 95 which invade and extend into and interfere with the edges of the hexagonal nut 70 when nut 70 is received within the socket S. A resilient rubber band 98 is placed around the socket. Like the groove 94 at flat members 95, band 98 interferes with a nut 70 once the nut 70 is within the socket. It can therefore be understood that once socket S is about a nut 70 the nut is retained to the socket S.

Referring to FIG. 4A the initial remote and submerged encirclement of a tie rod T at threaded end 44 is set forth. It can be seen that socket S initially contacts gathering surface 66 on tang 50. In the illustration of FIG. 4A such contact has initially occurred. It will be remembered that this illustration only shows one of the two tangs of the lock washer member M.

Referring to FIG. 4B socket S has passed gathering surface 66 and bend 68. Socket S now makes contact with the nut retaining side 69 in the downwardly extending inverted U of tang 50. As can be seen tang 50 at bend 68 and partially at the nut retaining surface 69 is being biased away. This bias away is from the threaded end 44 of tie rod T.

Referring to FIG. 4C socket S is shown just before the capture of hex nut 70 on tie rod T. Tang 50 at bolt retaining surface 69 is now biased out of contact with the sides 72 of the hex nut 70. It will be understood that the gathering surface 45 on tie rod T has centered socket S.

Finally, and with respect to FIG. 4D, it can be seen that socket S has completely captured hex nut 70. At the same time, band 98 in groove 94 fastens to or captures the nut within socket S. Rotation of the socket will produce disengagement of the nut 70. Ring 98 will cause the disengaged nut to be engaged interiorly of the socket S and prevent the nut falling free as a loose part.

It will be understood that with respect to FIGS. 4A-4D and the cartoon series illustrated that the action of one tang 50 with respect to socket S has been illustrated. The reader can understand that remaining tangs 50, there being two such tangs at each tie rod, will act in precisely an analogous manner.

It will be understood that the spring tang member 50 constitutes the novel aspect of the lock washer of this invention.

We claim:

1. In the combination of a nuclear fuel bundle including a lower tie plate defining a first matrix of fuel rod support locations and a second matrix of coolant inlet apertures;

an upper tie plate defining a corresponding matrix of fuel rod support locations and having a second matrix for the outflow of water and generated steam;

a plurality of fuel rods supported on said lower tie plate and extending to and through said upper tie plate for side-by-side upstanding support between said upper and lower tie plate;

a channel surrounding said fuel rods and extending from said lower tie plate to said upper tie plate to confine fluid flow within said bundle between said tie plates for the controlled flow of water coolant and the generation of steam;

a plurality of said fuel rods having first and second threaded ends to form tie rods for maintaining said upper and lower tie plate in spaced apart relation for maintenance of said fuel rods to said fuel bundle;

said lower tie plate including threaded tie rod receiving apertures complementary to the threading at the bottom of said tie rods whereby a plurality of tie rods may be threaded to said lower tie plate;

said upper tie plate including apertures for permitting the threaded upper end of said tie rods to extend upwardly and through said upper tie plate to permit hex nuts threaded to said upper tie plate to be threaded over the upper end of said tie rods to retain said upper tie plate in place;

a lock washer member captured between the bottom of said threaded bolts and the upper surface of said upper tie plate, said lock washer member including means extending between a plurality of said tie rods for preventing relative rotation of said tie rods to secure said tie rods to said lower tie plate;

and tangs for engagement to said nuts to lock said bolts from rotation, the improvement to said tangs comprising at least one tang at said tie rod washer member, said tang radially protruding from said tie rod washer member;

said tang formed from spring material and bent in an inverted U configuration with a first leg of said U extending from said tie rod surrounding washer member and a second and distal end of said U extending to a position of interference with the side of said hex nut;

said inverted U configured to bend within the elastic limit whereby bias of said interfering tang member can occur towards and away from said bolt to permit assembly and disassembly of said bolt from the threaded end of said tie rod.

2. The invention of claim 1 and including a plurality of tang members at each said tie rod surrounding washer member.

3. The invention of claim 1 and wherein said tang member forms with respect to the threaded end of said tie rod a gathering surface to permit a wedging entry of a socket in the interstitial volume between said gathering surface and threaded tie rod end.

* * * * *